(12) United States Patent
Martinello et al.

(10) Patent No.: US 11,157,728 B1
(45) Date of Patent: Oct. 26, 2021

(54) PERSON DETECTION AND IDENTIFICATION USING OVERHEAD DEPTH IMAGES

(71) Applicants: Manuel Martinello, Mountain View, CA (US); Edward L. Schwartz, Sunnyvale, CA (US)

(72) Inventors: Manuel Martinello, Mountain View, CA (US); Edward L. Schwartz, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 9 days.

(21) Appl. No.: 16/838,522

(22) Filed: Apr. 2, 2020

(51) Int. Cl.
*G06K 9/00* (2006.01)
*G06T 7/50* (2017.01)
*G06K 9/62* (2006.01)

(52) U.S. Cl.
CPC ..... *G06K 9/00369* (2013.01); *G06K 9/00624* (2013.01); *G06K 9/6218* (2013.01); *G06T 7/50* (2017.01); *G06T 2207/10028* (2013.01)

(58) Field of Classification Search
CPC .......... G06K 9/00369; G06K 9/00624; G06K 9/6218; G06T 7/50; G06T 2207/10028
See application file for complete search history.

(56) References Cited

U.S. PATENT DOCUMENTS

| | | | |
|---|---|---|---|
| 5,703,367 A | 12/1997 | Hashimoto et al. | |
| 8,295,545 B2 | 10/2012 | Hampapur et al. | |
| 9,355,334 B1 * | 5/2016 | Martinson | G06K 9/00369 |
| 9,361,524 B2 | 6/2016 | Ghanem et al. | |
| 10,956,777 B1 * | 3/2021 | Mirza | G06K 9/00711 |
| 2005/0216274 A1 * | 9/2005 | Kim | G06K 9/00362 704/276 |
| 2012/0087572 A1 * | 4/2012 | Dedeoglu | G06K 9/00201 382/154 |
| 2012/0308116 A1 * | 12/2012 | Eichorn | G06K 9/00335 382/154 |
| 2013/0182905 A1 | 7/2013 | Myers et al. | |

(Continued)

OTHER PUBLICATIONS

Uchidate, Hikaru et al., "Counting People and Recognizing Wheelchairs at Elevator Lobby by Real-Time Image Processing", The Institute of Electrical Engineers of Japan, vol. 129, No. 6, 2009, pp. 578-584.

(Continued)

*Primary Examiner* — Ming Y Hon
(74) *Attorney, Agent, or Firm* — Patent Law Works LLP

(57) ABSTRACT

A method for person detection using overhead images includes receiving a depth image captured from an overhead viewpoint at a first location; detecting in the depth image for a target region indicative of a scene object within a height range; determining whether the detected target region has an area within a head size range; if within the head size range, determining whether the detected target region has a roundness value less than a maximum roundness value; if less than the maximum roundness value, classifying the detected target region as a head of a person and masking the classified target region in the depth image, where the masked region is excluded from detecting; and repeating the detecting to the masking to detect for and classify another target region in the depth image within the height range and outside of the masked region.

23 Claims, 9 Drawing Sheets

(56) References Cited

U.S. PATENT DOCUMENTS

| | | | | |
|---|---|---|---|---|
| 2014/0139633 | A1* | 5/2014 | Wang | G06K 9/00778 348/46 |
| 2015/0073914 | A1* | 3/2015 | Tsou | G06Q 30/0276 705/14.66 |
| 2016/0335490 | A1* | 11/2016 | Wang | G06K 9/00778 |
| 2017/0277943 | A1* | 9/2017 | Shingu | G06K 9/00355 |

OTHER PUBLICATIONS

Yahiaoui, Tarek et al., "A People Counting System Based on Dense and Close Stereovision", 3rd International Conference on Image and Signal Processing, ICISP'2008, Jul. 2008, Cherbourg-Octeville, France. pp. 59-66.

Wateosot, Chonthisa et al., "Top-view Based People Counting Using Mixture of Depth and Color Information", https://pdfs.semanticscholar.org/004a/3f948114a2d158eba7a2ae3893dee6c09b11.pdf, Date Accessed Apr. 1, 2020, 4 pgs.

Villamizar et al., "WatchNet: Efficient and Depth-based Network for People Detection in Video Surveillance Systems", International Conference on Advanced Video and Signal-based Surveillance (AVSS), Auckland, New Zealand, Nov. 2018, 6 pgs.

Sun, Shijie et al., "Benchmark data and method for real-time people counting in cluttered scenes using depth sensors", Journal of Latex Class Files, vol. 14, No. 8, Apr. 2018, 15 pgs.

Rauter, Michael et al., "Reliable Human Detection and Tracking in Top-View Depth Images", https://www.cv-foundation.org/openaccess/content_cvpr_workshops_2013/W12/papers/Rauter_Reliable_Human_Detection_2013_CVPR_paper.pdf, 2013, pp. 529-534.

Ahmad, Misbah et al., "Person Detection from Overhead View: A Survey", (IJACSA) International Journal of Advanced Computer Science and Applications, vol. 10, No. 4, 2019, pp. 567-577.

Nakatani, Ryota et al., "A Person Identification Method Using a Top-view Head Image from an Overhead Camera", J. Adv. Comput. Intell. Intell. Inform., vol. 16, No. 6, pp. 696-703, 2012.

Onishi, Masaki et al., "Visualization of Customer Flow in an Office Complex over a Long Period", 2010 International Conference on Pattern Recognition, pp. 1747-1750.

Malawski, Filip, "Top-view People Counting in Public Transportation using Kinect", The challenges of contemporary science. Theory and applications, ISBN 978-83-935118-1-5, pp. 39-40.

Garcia, Jorge et al., "Directional People Counter Based on Head Tracking", IEEE Transactions on Industrial Electronics, vol. 60, No. 9, Sep. 2013, pp. 3991-4000.

Burbano, Andres et al., "3D-Sensing Distributed Embedded System for People Tracking and Counting", 2015 International Conference on Computational Science and Computational Intelligence, pp. 470-475.

* cited by examiner

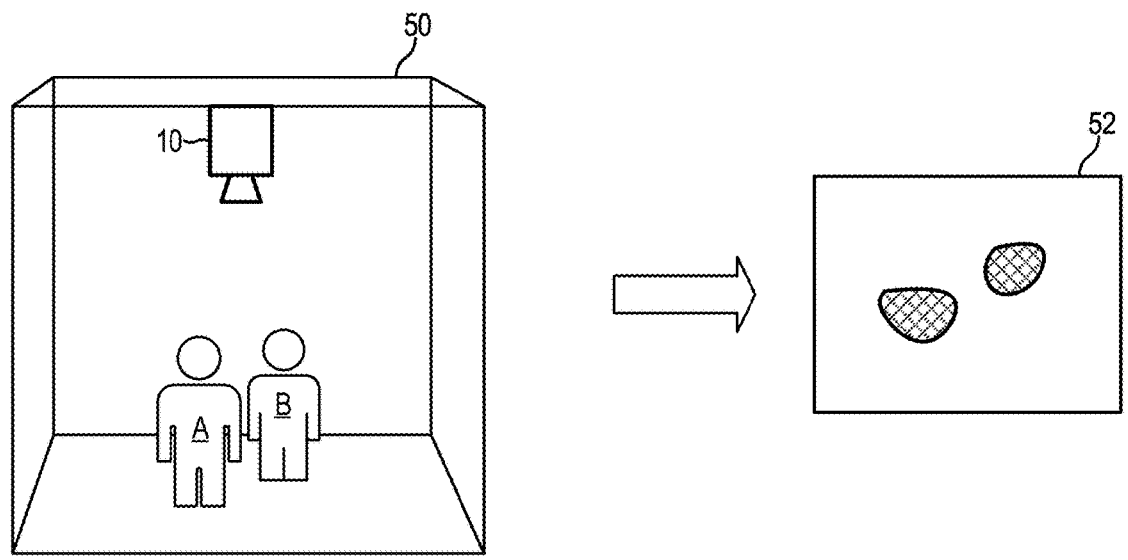
FIG. 3(a)
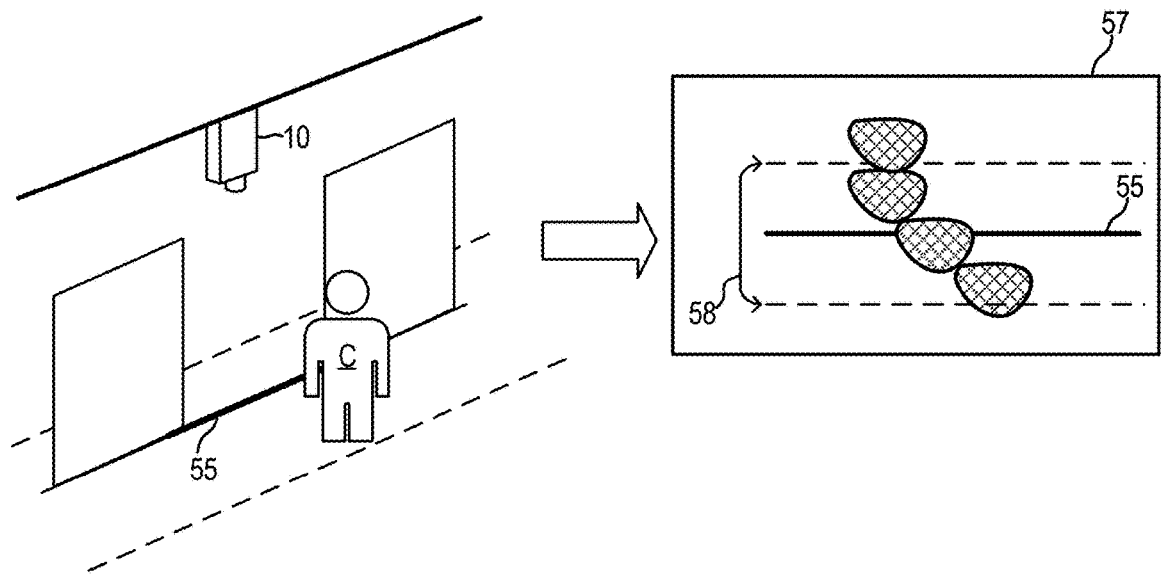
FIG. 3(b)
FIG. 3

PERSON DETECTION AND IDENTIFICATION USING OVERHEAD DEPTH IMAGES

FIELD OF THE INVENTION

The invention relates to person detection and identification using overhead images and, in particular, to a system and method using overhead depth images for occupancy detection and person re-identification.

BACKGROUND OF THE INVENTION

Image-based person identification using overhead or top-view head images has been applied in various surveillance situations. Person identification using overhead images avoids some of the issues associated with using facial information, such as occluded face images from frontal images. Person identification using overhead images also solves the privacy issue because face images of the persons are not captured. Applications of overhead image-based person identification include retail or in-store surveillance, in office surveillance, and public transportation surveillance. Overhead image person identification has been applied to preform automatic people counting or occupancy detection.

SUMMARY OF THE INVENTION

The present disclosure discloses a method and system for overhead person detection and/or identification, substantially as shown in and/or described below, for example in connection with at least one of the figures, as set forth more completely in the claims.

In some embodiments, a method for person detection using overhead images includes receiving a depth image captured from an overhead viewpoint at a first location; detecting in the depth image for a target region indicative of a scene object within a height range; determining whether the detected target region has an area within a head size range; in response to the detected target region being within the head size range, determining whether the detected target region has a roundness value less than a maximum roundness value; in response to the detected target region having the roundness value less than the maximum roundness value, classifying the detected target region as a head of a person; in response to the classifying, masking the classified target region in the depth image, the masked region being excluded from detecting; and repeating the detecting to the masking to detect for and classify another target region in the depth image within the height range and outside of the masked region.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

Various embodiments of the invention are disclosed in the following detailed description and the accompanying drawings.

FIG. 3, which includes FIGS. 3(a) and 3(b), illustrates applications of the overhead person detection and identification system in some examples.

DETAILED DESCRIPTION

According to embodiments of the present disclosure, a method and system for person detection and identification uses overhead depth images and applies conditions to evaluate target regions detected in the overhead depth images to classify target regions as heads of persons. In some embodiments, the overhead person identification method and system can be applied for counting people, such as counting people in a given space or counting people crossing a region of interest, such as an entrance. In further embodiments, the overhead person detection and identification method and system is configured to generate a person identifier using a descriptor value derived from the classified target region. The person identifier can be used to re-identify the same person within a given duration or within a given space. Alternately, the person identifier can be used to track the person throughout a given space.

In the present description, a depth image, also referred to as a range image or a depth map, refers to an image or image channel that contains information relating to the distance of the surfaces of scene objects from a viewpoint. In other words, a depth image shows the distance to points in a scene from the viewpoint where the viewpoint is associated with some type of sensor device.

Figure 1:
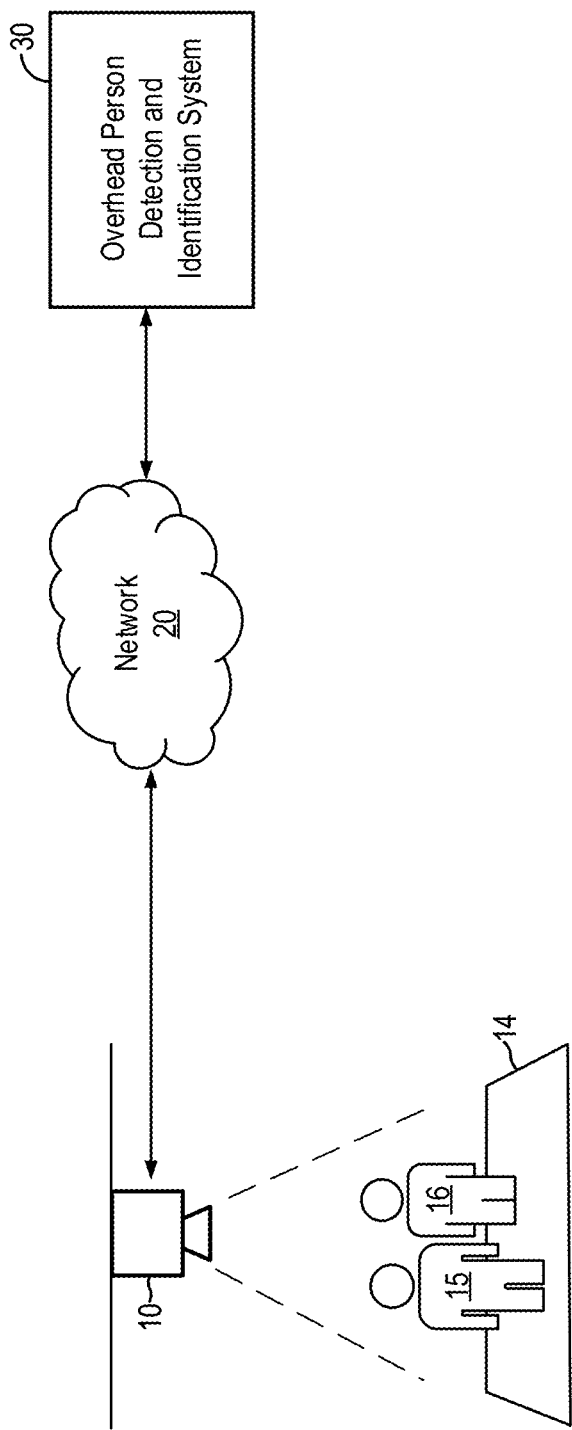
FIG. 1 illustrates a system environment in which an overhead person detection and identification system using overhead images may be implemented in some embodiments.

FIG. 1 illustrates a system environment in which an overhead person detection and identification system using overhead images may be implemented in some embodiments. Referring to FIG. 1, an overhead person detection and identification system 30 of the present disclosure is arranged to receive depth images obtained from an overhead viewpoint. The overhead depth images are sometimes referred to as top-view head images. The overhead depth images may be captured by a sensor device 10 installed at an overhead position, such as at the ceiling, or at a desired location for obtaining overhead or top-view images. The sensor device 10 is configured to capture depth images or range images. The sensor device 10 can be any type of range imaging or depth imaging devices. The type of sensor device 10 for capturing the depth images is not critical to the practice of the present invention. The overhead person detection and identification system 30 operates on depth images generated by any type of sensing devices capable of producing a depth image output. In some examples, the sensor device 10 is an image sensor, an imaging device, a digital camera, or a set of image sensing devices. The sensor device 10 can be implemented as a range camera implementing various depth sensing techniques, including stereo triangulation, sheet of light triangulation, structured light, and time-of-flight technique.

In some embodiments, the overhead person detection and identification system 30 is in data communication with the sensor device 10, either directly or through a data network 20, as shown in FIG. 1. In other embodiments, the sensor device 10 may be configured to transmit captured images to a data store, which may be provided local to the sensor device (i.e., a local storage device) or provided on a data network (i.e. a cloud storage device). The overhead person detection and identification system 30 obtains the depth images capture by the sensor device 10 by retrieving the images from the data store, either by connecting to the local storage device or by connecting to the cloud storage device.

In the present description, the depth image is a two dimensional array of pixel values where each pixel value is a depth value indicative of a distance of a surface of a scene object from the overhead viewpoint positioned at a first location. For example, as shown in FIG. 1, the sensor device 10 captures a depth image of the scene including two persons 15, 16 as the scene object. The depth image includes pixel values indicative of the distance from the sensor device 10 to the surface of the persons 15, 16.

The depth values represented by the depth image can be converted to height values by subtracting the depth value from a reference depth location distant from the overhead viewpoint. In the present example, the reference depth location is the floor 14 in the scene. When the distance from the sensor device 10 to the floor 14 is known, each depth value can be converted to a height value indicative of a distance from the depth value (the surface of the scene object) to the reference depth location (the floor). For example, the depth value can be subtracted from the reference depth value (the distance from the sensor device 10 to the floor 14) to obtain the height value.

In some embodiments the depth values represented by the depth image include a value or values that indicate that depth information is not available for that pixel. For example, with a structured light technique, pixels that correspond to a location that does not reflect the structured light back to the sensor have no depth information. Pixels without depth information are ignored. In some embodiments, the value 0 may be used to indicate that no depth information is available. In some embodiments, values close to 0 (for example 0 . . . 10) may be used to indicate that no depth information is available.

In embodiments of the present disclosure, one or more sensor devices 10 can be installed at various locations desired for people counting, people detection or surveillance. For example, the sensor devices 10 can be installed at retail stores, at office buildings, at public transportation hubs, at museums or conference centers. The sensor devices 10 capture depth images which are provided to the overhead person detection and identification system 30 to perform people counting and/or person identification and tracking, as described in more details below. As described above, a group of sensor devices 10 may store the captured depth images on a local storage device or on a cloud storage device. The overhead person detection and identification system 30 may obtain the depth images directly from the sensor devices, or from the local storage device or from a cloud storage device.

Figure 2:
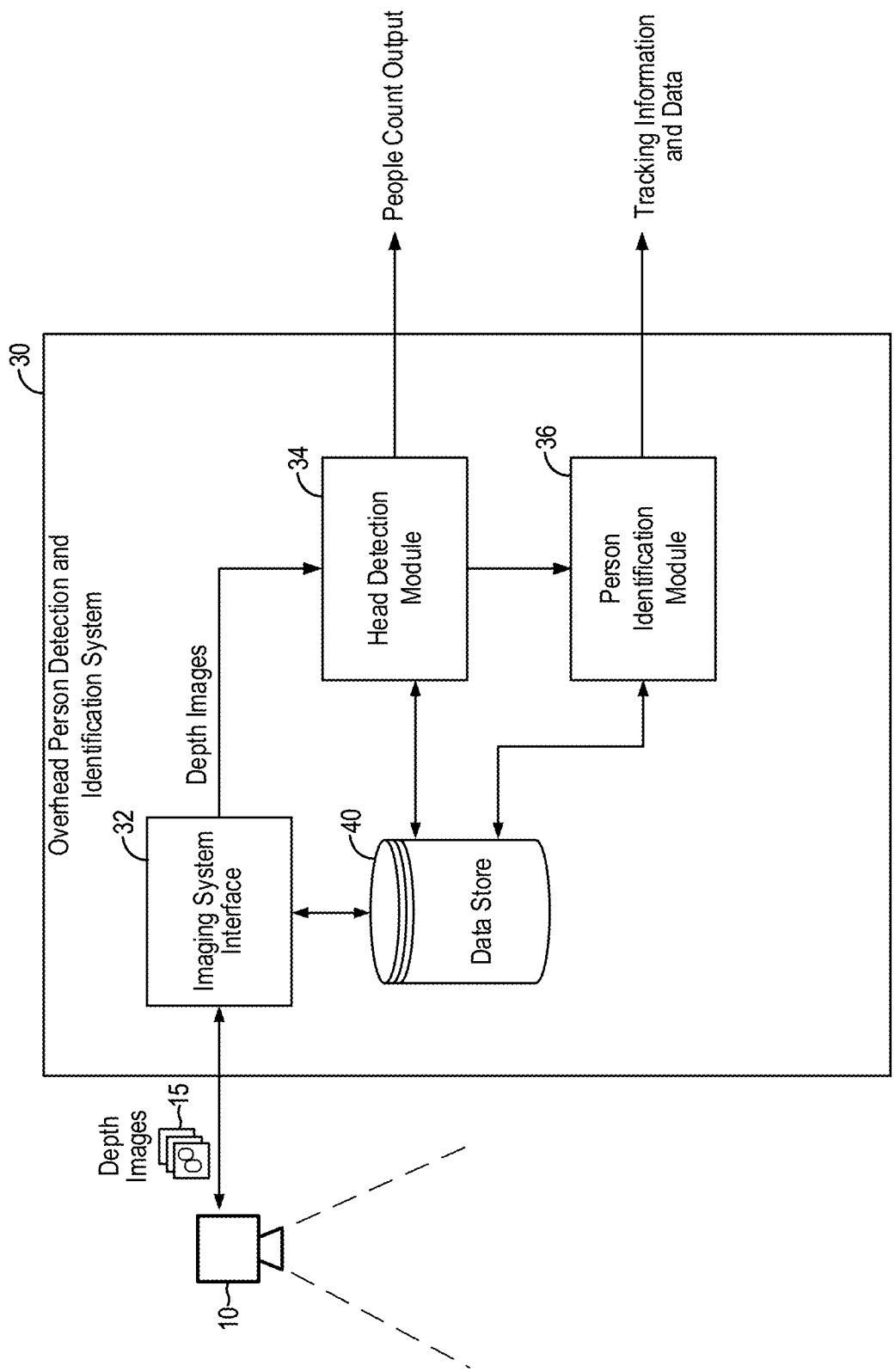
FIG. 2 is a block diagram illustrating an overhead person detection and identification system in embodiments of the present disclosure.

FIG. 2 is a block diagram illustrating an overhead person detection and identification system in embodiments of the present disclosure. Referring to FIG. 2, the overhead person detection and identification system 30 includes an imaging system interface 32 configured to receive depth images 15 captured by one or more sensor devices 10 at one or more locations. The imaging system interface 32 may be configured to communicate with the sensor devices 10 directly or through a data network. The imaging system interface 32 may also be configured to obtain the depth images from a data store, which may be a data store local to the sensor devices 10 or a cloud storage database. The overhead person detection and identification system 30 includes a data store 40 to store the received depth images. The overhead person detection and identification system 30 includes a head detection module 34 to process the depth images to recognize scene objects that can be classified as being the head of a person. In the present embodiment, the head detection module 34 detects and classify image regions in the depth images and provide a people count output indicative of the number of heads being counted in each depth image. The head detection module 34 may be in communication with the data store 40 to retrieve depth images or to store people count data.

In some embodiments, the overhead person detection and identification system 30 further includes a person identification module 36. The person identification module 36 is configured to generate a person identifier using a descriptor value derived from an image region being counted as the head of a person. The person identifier can be used to identify a person within a surveillance area by comparing the person identifier to previously generated person identifier. By finding matching person identifiers obtained from depth images across an area or at various locations, the location or movement of a person can be tracked. In embodiments of the present disclosure, the person identification module 36 receives data from the head detection module 34 relating to image regions being counted as a head of a person. The person identification module 36 may also receive the data from the data store 40. In the present embodiment, the person identification module 36 provide tracking information or data as output for a person identifier of interest or for all matched person identifiers. The person identification module 36 may be in communication with the data store 40 to retrieve depth images or to store personal identifiers and/or tracking data.

In embodiments of the present disclosure, the overhead person detection and identification system 30 performs three main tasks. First, the system 30 performs person detection. In the present description, person detection refers to evaluating an image area and making a determination whether the image area is a person or not a person. Second, the system 30 identifies a detected person. In response to an image area or image region being classified as a detected person, the system 30 generates a person identifier for the detected person from information associated with the image area. Accordingly, each detected person is identified by an associated person identifier which may be stored with associated metadata. Third, the system 30 uses the previously generated person identifiers to re-identify detected persons within a surveillance area and/or within a surveillance time period. In response to a person identifier being generated, the system 30 compares the person identifier to previously generated person identifiers to determine if the same identifier have been recorded previously. In this manner, a detected person can be tracked throughout a surveillance area and/or a surveillance period.

FIG. 3, which includes FIGS. 3(a) and 3(b), illustrates applications of the overhead person detection and identification system in some examples. Referring first to FIG. 3(a), in some examples, the overhead person detection and identification system of the present disclosure is applied for occupancy detection in a space, such as a room 50. A sensor device 10 is mounted at an overhead location, such as the ceiling, to capture overhead depth images of the scene. The depth images are processed and analyzed by the overhead person detection and identification system to classify scene objects and to count the number of heads of persons. For example, the overhead person detection and identification system of the present disclosure can be applied to detect in the depth image 52 two image regions as the heads of a person A and a person B. In this case, the overhead person detection and identification system would provide a count of 2 as output for the depth image.

Referring to FIG. 3(b), in some examples, the overhead person detection and identification system of the present disclosure is applied for counting people in or crossing a region of interest, denoted by a line 55 in FIG. 3(b). In the present description, the region of interest is sometimes referred to as a "fence" which refers to a virtual boundary at which events are of interest. For example, a fence can be at a doorway to a room, at a entrance to a store, at an entryway to a secured area. A sensor device 10 is mounted at an overhead location, such as the ceiling, to capture overhead depth images occurring at or near the fence. In particular, in some embodiments, the sensor device 10 may be motion triggered and captures depth images in response to motion being detected around or near the fence 55. In some examples, a band region 58 extending to both sides of the fence 55 form the region of interest for motion detection and people counting. The sensor device 10 may capture a series of depth images 57 in response to motion being detected inside the region of interest, as defined by the band 58. In FIG. 3(b), the series of depth images 57 shows a person C entering the band region and crossing the fence 55 and then exiting the band region on the opposite side. In some embodiments, the overhead person detection and identification system uses the depth image of a scene subject overlapping with the fence 55 for further analysis and classification.

Figure 4:
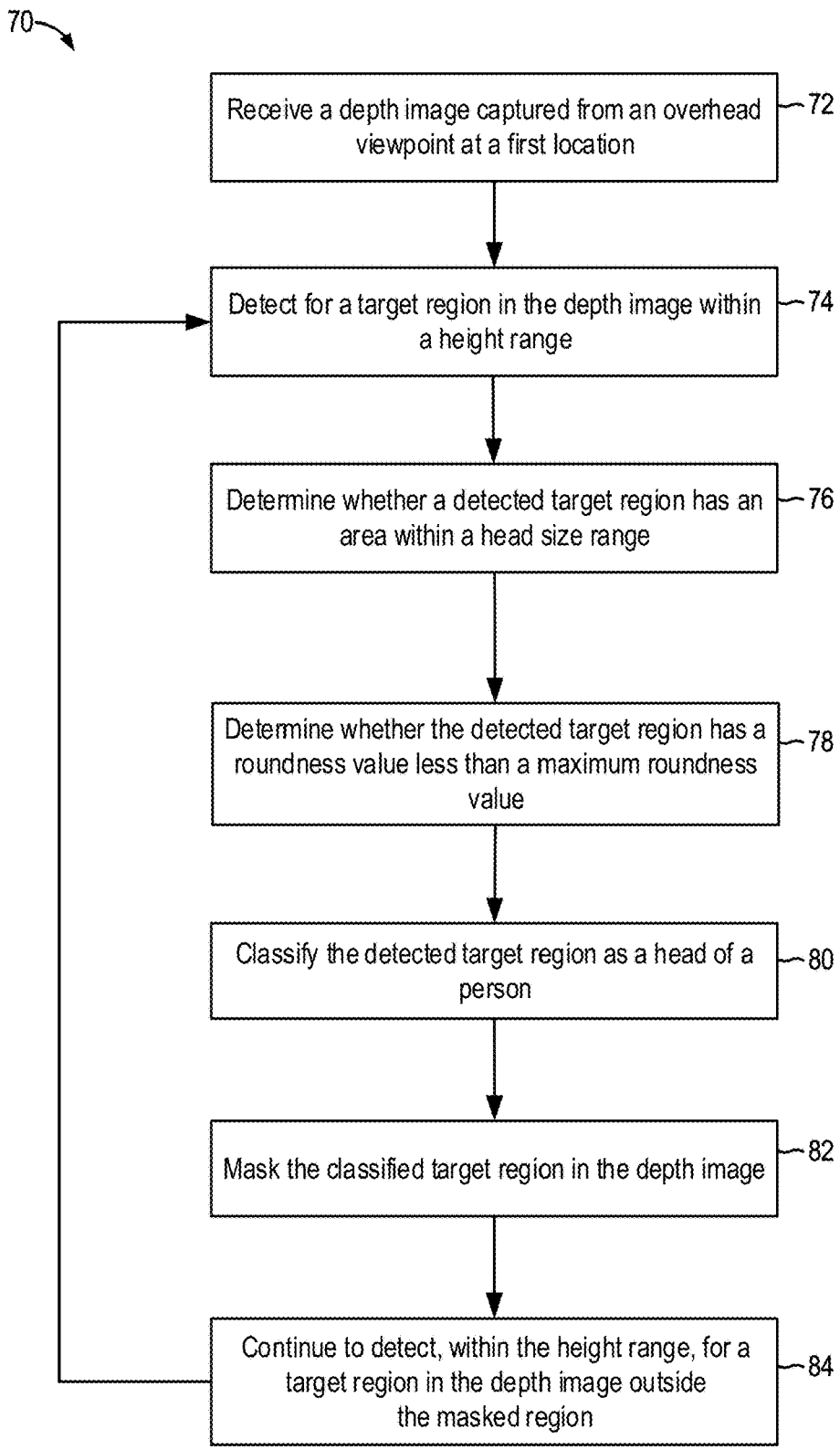
FIG. 4 is a flowchart illustrating an overhead person detection method in embodiments of the present disclosure.

FIG. 4 is a flowchart illustrating an overhead person detection method in embodiments of the present disclosure. The overhead person detection method can be implemented in the overhead person detection and identification system 30 of FIG. 2 in some embodiments. Referring to FIG. 4, an overhead person detection method 70 starts by receiving a depth image captured from an overhead viewpoint at a first location (72).

As described above, the depth image is a two dimensional array of pixel values denoting the distance from the viewpoint to the surfaces of scene objects. The depth values can be translated to height values by subtracting the depth values from a reference depth location (e.g. the floor) that is distant and opposite from the viewpoint. For instance, the reference depth location represents a depth that is distant and farthest away from the viewpoint that can be captured by the depth image. In the following description, height values and depth values may be used interchangeably to describe location of the surface of a scene object lying between the viewpoint and the floor. It is understood that a depth value can be translated into a height value and vice versa as long as the distance from the viewpoint to the reference depth location is known.

The method 70 detects for a target region indicative of a scene object in the depth image within a height range (74). In embodiments of the present disclosure, the height range is selected to approximate a range of head height locations of typical adult persons. That is, the height range is selected at height locations where the heads of typical adult persons will likely be located. The method 70 detects for a target region indicative of a scene object in the depth image within the height range. In this manner, method 70 focuses the detection operation in a range of depth that will most likely include the heads of adult persons. Detection is not performed in depth regions where heads of adult person are not expected. In other embodiments, the height range is selected to approximate the height locations where heads of typical persons (including children or adult) will likely be located.

In embodiments of the present disclosure, the method 70 detects for a target region indicative of a scene object by applying thresholding to the depth values. That is, the method 70 analyzes the depth image by thresholding the depth values from minimum to maximum (or thresholding the height values from maximum to minimum). At each depth threshold value, the method 70 detects for a target region including pixel values equal to and less than the depth threshold value. For each detected target region within the height range, the method 70 determines whether the detected target region has an area within a head size range (76). In some embodiments, detected target regions are connected components of the binary image resulting from the thresholding. In other embodiments, detected target regions are connected pixels or connected regions of pixels in the binary image resulting from the thresholding. In embodiments of the present disclosure, the head size range is selected to approximate a range of head circumference values of the typical adult persons. Accordingly, when a target region is detected, the method 70 determines if the target region has an area of the right size to be classified as the head of a person.

In the case the method 70 determines a target region has an area that is within the head size range, the method 70 determines whether the detected target region has a roundness value that is less than a maximum roundness value (78). In embodiments of the present disclosure, the method 70 evaluates the roundness of the target region to determine if the target region has the necessary shape to be classified as the head of a person. In embodiments of the present disclosure, the shape of the head of a person is assumed to resemble a circle as viewed from above. Therefore, the method 70 evaluates the detected target region for roundness to determine if the detected target region has a sufficiently rounded shape to be classified as the head of a person. In some embodiments, the roundness of the target region is also referred to as compactness of the region. The roundness or compactness parameter measures how closely the shape of a target region approaches the shape of a circle. A circle has the smaller roundness value and any shape other than a circle will have a roundness value greater than that of a circle. The maximum roundness value denotes the maximum shape deviation from a circle where a shape can still be considered the head of a typical adult person. In other embodiments, the method 70 uses a maximum roundness value that denotes the maximum shape deviation from a circle where a shape can still be considered the head of a typical person, including children or adult.

In some embodiments, the roundness value is determined as the quotient of the perimeter of the detected target region divided by the square-root of the area of the detected target region.

Figure 5:
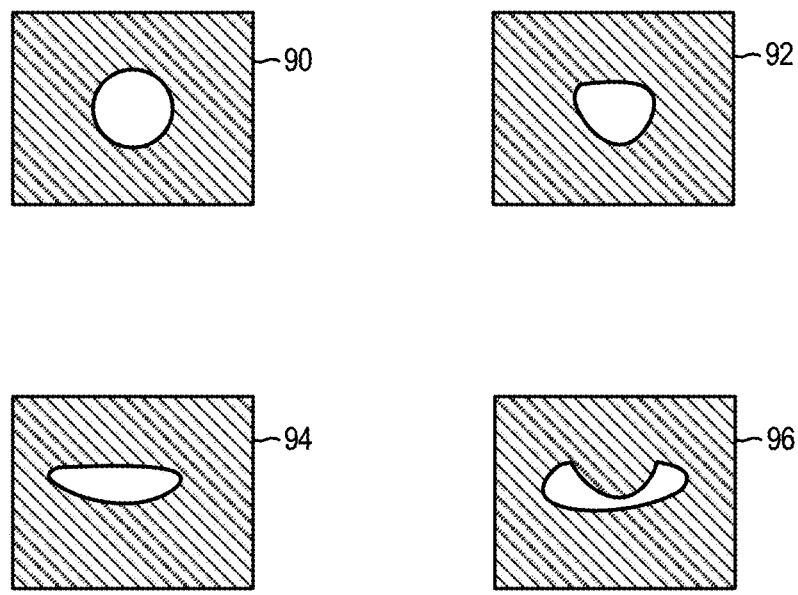
FIG. 5 illustrates various shapes of target regions for roundness evaluation in some examples.

FIG. 5 illustrates various shapes of target regions for roundness evaluation in some examples. Referring to FIG. 5, a target region having a circle shape in an image frame 90 will have the lowest roundness value. A target region in the image frame 92 having an irregular circular shape has sufficient roundness and compactness to yield a sufficiently small roundness value. A target region in the image frame 94 of an elongated elliptical shape will have a large roundness value as the shape is not very round or compact. Finally, a target region in an image frame 96 having an irregular shape with have a large roundness value. In embodiments of the present disclosure, the maximum roundness value is selected to discriminate between the target regions in image frames 90 and 92, which can approximate the heads of persons, versus the target regions in image frames 94 and 96, which does not approximate the heads of persons.

Returning to FIG. 4, in the case the method 70 determines the detected target region has a roundness value less than a maximum roundness value, the method 70 classifies the detected target region as a head of a person (80). In response to the classification, the method 70 then masks the classified region in the depth image (82). In the present disclosure, masking the classified region refers to excluding the pixel values in the classified regions from further detection. The method 70 then continues to detect, within the height range, for a target region in the depth image (84). The detection is performed outside of the masked region, or by ignoring the pixels in the masked region.

In alternate embodiments of the present disclosure, the method 70 further applies optical flow analysis to determine whether the pixel values in the detected target region have substantially identical relative motion. That is, if a target region is to be considered to be the head of a person, then all the pixels within the target region should be moving in the same direction. Accordingly, the method 70 may further apply the optical flow analysis, in addition to the head size and the head roundness parameters to classify a target region as a head of a person. In other embodiments, additional parameters may be applied to classify a target region.

The overhead person detection method of the present disclosure realizes many advantages over conventional techniques. First, the overhead person detection method evaluates the depth image within a height range with a high likelihood of the presence of heads of persons. The method does not evaluate in areas where it is unlikely to include heads of persons. Second, the overhead person detection method evaluates a detected target region using a set of parameters to ensure accurate head classification. In the present examples, the target region is evaluated for a head size range and for roundness and compactness. In other examples, the target region may further be evaluated using optical flow analysis to detect relative motions of the pixels within the target region. Lastly, the overhead person detection method provides a fast and efficient scheme for person detection or person counting in a depth image.

Figure 6:
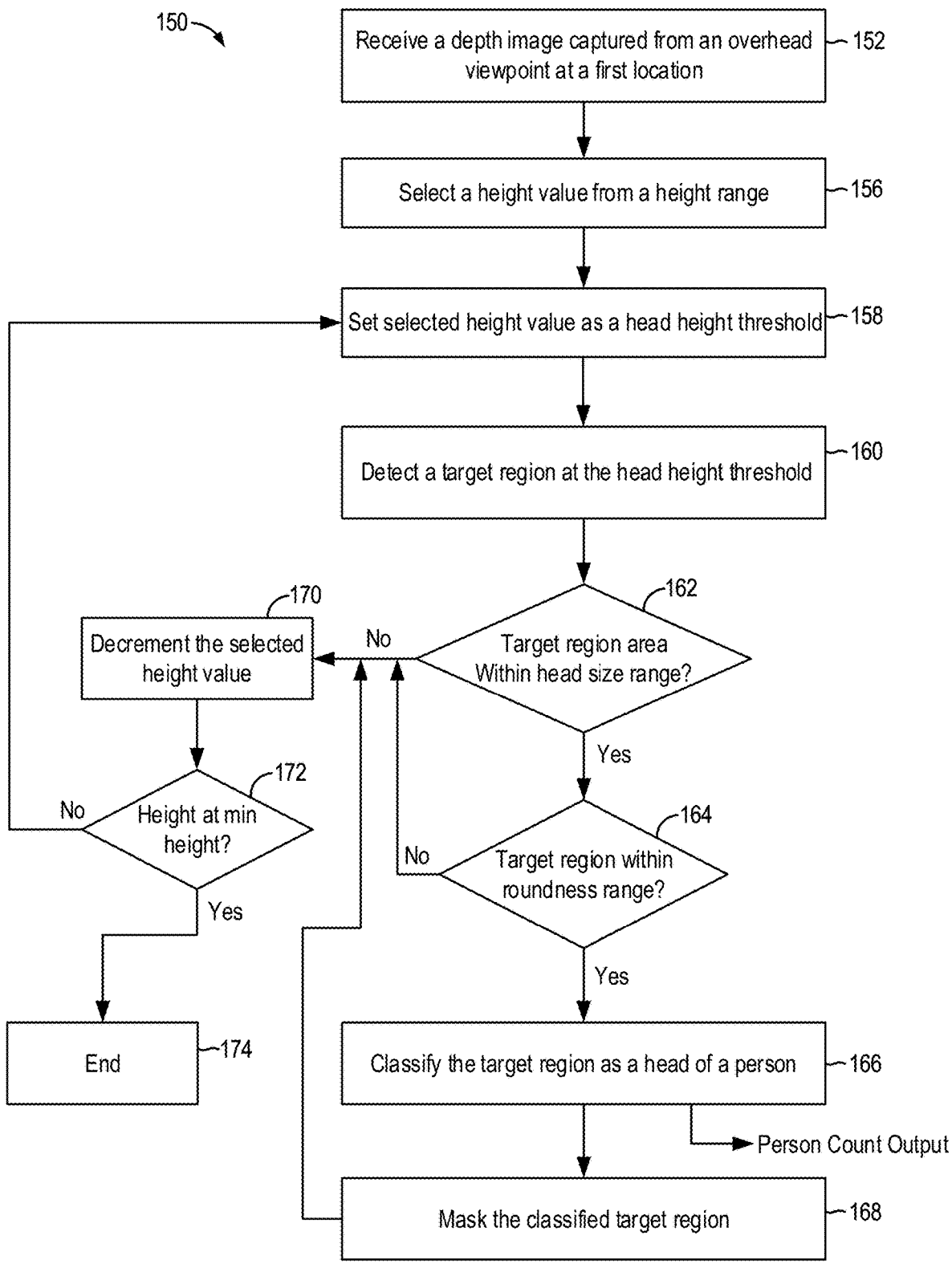
FIG. 6 is a flowchart illustrating an overhead person detection method in alternate embodiments of the present disclosure.
Figures 7, 7A:
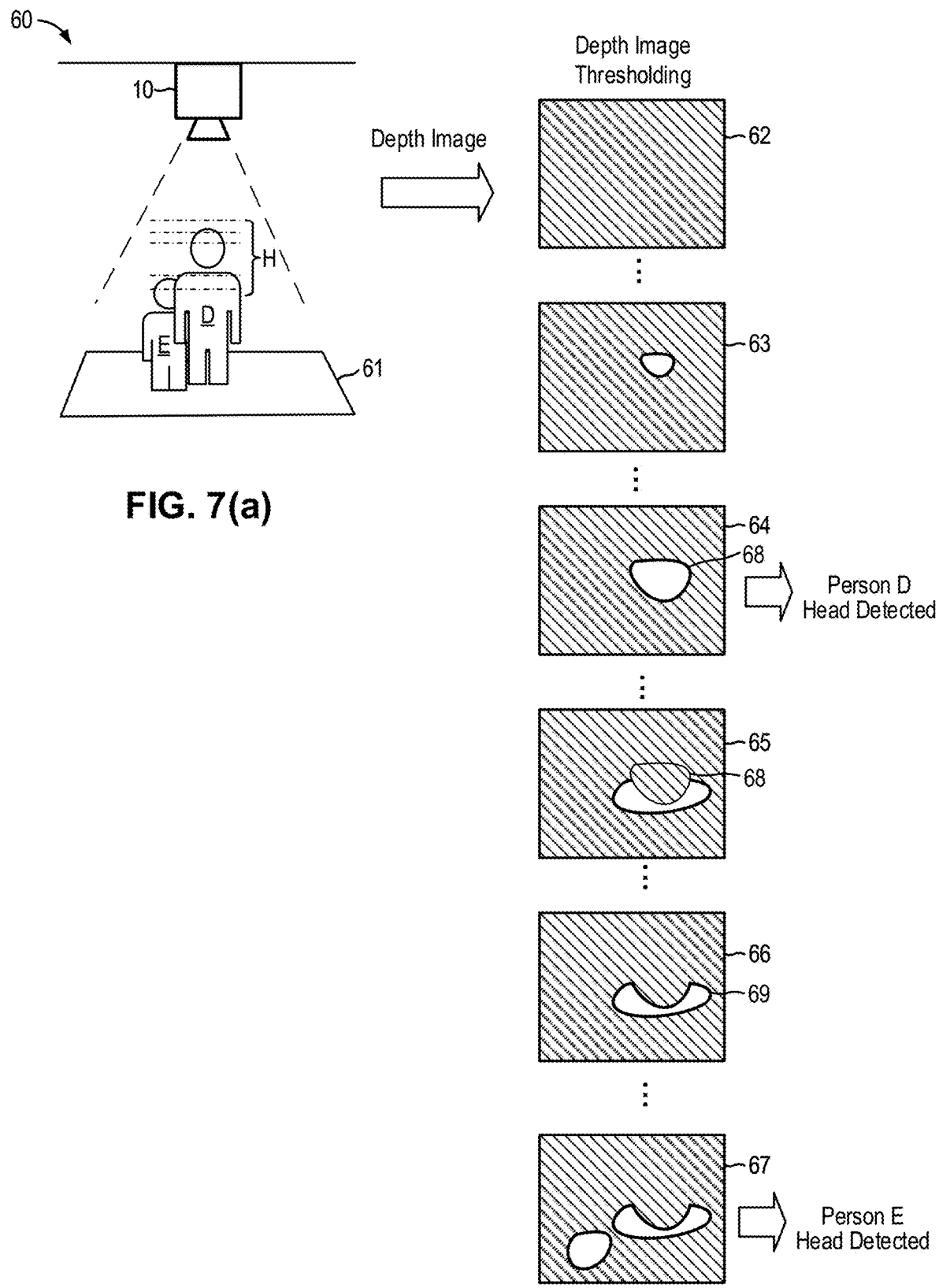
FIG. 7, which includes
FIG. 7(a), illustrates the operation of the overhead person detection method in embodiments of the present disclosure.

FIG. 6 is a flowchart illustrating an overhead person detection method in alternate embodiments of the present disclosure. The overhead person detection method can be implemented in the overhead person detection and identification system 30 of FIG. 2 in some embodiments. The operation of the overhead person detection method of FIG. 6 will be described with reference to FIG. 7. FIG. 7, which includes FIG. 7(a), illustrates the operation of the overhead person detection method in embodiments of the present disclosure. Referring to FIGS. 6 and 7, an overhead person detection method 150 starts by receiving a depth image captured from an overhead viewpoint at a first location (152). For example, as shown in FIG. 7(a), the depth image may be captured by a sensor device 10 mounted in the ceiling of a space 60 to capture a scene at that location. The space 60 may be a room, an area within a large room, an indoor or an outdoor space, or a region of interest, such as an entrance or a doorway.

As described above, the depth image is a two dimensional array of pixel values denoting the distance from the viewpoint (sensor device 10) to the surfaces of scene objects. The depth values can be translated to height values by subtracting the depth values from the reference depth location—the floor 61. That is, the floor 61 (the reference depth location) represents a depth that is distant and farthest away from the viewpoint at the sensor device 10. It is understood that a depth value can be translated into a height value and vice versa as long as the distance from the viewpoint to the reference depth location is known.

The method 150 selects a height value from a height range (156). The method 150 may also select a depth value from the corresponding depth range. In FIG. 7(a), the height range is denoted by H. As described above, the height range H refers to a range of height values as measured from the floor 61. The height range can be translated to a depth range for denoting a range of depth values as measured from the viewpoint (sensor device 10). In the present embodiment, the height range H is selected at height locations where the heads of typical adult persons will likely be located. The method 150 then set the selected height value as a head height threshold (158). The method 150 then detect a target region indicative of a scene object at the head height threshold (160).

In embodiments of the present disclosure, the method 150 detect for a target region indicative of a scene object by applying thresholding to the depth values. That is, the method 150 analyzes the depth image by thresholding the depth values from minimum to maximum (or thresholding the height values from maximum to minimum). At each head depth/height threshold, the method 150 detects for a target region by selecting the pixels having depth values at or below the depth threshold (or having height values at or above the height threshold). In the present description, the target region includes pixels with depth values indicating certain surfaces of a scene object being present at the head depth threshold (or the head height threshold).

FIG. 7 illustrates the operation of depth image thresholding in some examples. Image frames 62 to 67 represent binary image frames of the depth image obtained by thresholding depth values at successive depth locations (or successive height locations). In other words, each binary image frame 62-67 contains pixels of a first value (e.g. "1") indicating corresponding pixels in the depth image having depth values equal to or less than the depth threshold, and pixels of a second value (e.g. "0") indicating corresponding pixels in the depth image having depth values greater than the depth threshold.

In the present example, each successive depth location is denoted by the dot-dash lines in the height range H in FIG. 7(a). At each successive depth location, the method 150 detects for a target region of pixels having depth values that are equal to or less than the selected depth location (or pixels having height values that are equal to or greater than the selected height location). The target region indicates surfaces of a scene object being present at that depth location.

In the present embodiment, the target region is identified in the binary image frame as connected components or connected pixels or connected regions of pixels of the first pixel value (e.g. "1"), illustrated as the white regions in the binary image frames 62-67.

In some embodiments, the method 150 starts with the maximum height value as the first selected height value and decrements to the minimum height value. Alternately, the method 150 may start with the minimum depth value as the first selected depth value and increments to the maximum depth value. It is understood that the use of height values or depth values is interchangeable in the present description.

At each selected height value as the head height threshold, the method 150 determines if the target region has an area that is within a head size range (162). In some embodiments, the head size range is selected to approximate a range of head circumference values of the typical adult persons. In the case the target region is within the head size range, the method 150 then determines if the target region has a roundness value within the roundness range (164). In some embodiments, the roundness range is a maximum roundness value. The method 150 determines if the target region has a roundness value less than the maximum roundness value. In the case the target region has a roundness value within the roundness range, the method 150 classifies the target region as a head of a person (166). The method 150 may generate a count for the classified target region and provide a person count as output.

The method 150 then masks the classified target region (168). In the present description, masking the classified target region refers to marking or excluding the pixels in the classified target region from further detection.

The method 150 then continues to 170 to decrement the selected height value. Alternately, the method 170 may increment the selected depth value. In the case the target region has an area that is not within the head size (162) or the target region has a roundness value not within the roundness range (164), the method 150 also continues to 170 to decrement the height value (170). The method 170 determines if the selected height is at the minimum height (172). Alternately, the method 170 determines if the selected depth is at the maximum depth. If the minimum height or maximum depth is reached, the method 150 is terminated (174). If the minimum height or maximum depth is not yet reached, the method 150 returns to 158 to set the selected height value as the head height threshold. The method 150 continues to evaluate the depth image at the newly selected head height threshold.

In some embodiments, the method 150 uses a binary mask to perform the detection and evaluation operations. In some embodiments, the method 150 detects for the target region by generating a binary mask corresponding to the pixels of the depth image. The mask has a first value (e.g. "1") for pixels having a height value equal to or greater than the head height threshold. The mask has a second value (e.g. "0") for pixels having a height value less than the head height threshold. The method 150 detects the target region by identifying in the mask a region where connecting or adjacent pixels have the first value. The area of the target region is then computed based on the area of the connected pixels (or connected regions of pixels) in the mask having the first value. The roundness or compactness of the target region can be computed based on the perimeter of the connected pixels in the mask having the first value.

Furthermore, in some embodiments, the method 150 masks the classified target region by setting the pixels in the classified target region to the second value permanently. In this manner, the pixels in the classified target region will be excluded from further detection and analysis.

FIG. 7 illustrates one example of the operation of the overhead person detection method 150 of FIG. 6. FIG. 7 illustrates the process in detecting the depth image being captured in the scene in FIG. 7(a) which includes a person D and a person E. In the present example, the image frames 62 to 67 illustrate the binary mask being used to detect and evaluate the target region. The method 150 starts by selecting the maximum height value. For example, the height value corresponding to the topmost dot-dash line in the height range in FIG. 7(a) is selected. The image frame 62 represents the mask by applying the selected head height threshold to the depth image of the scene in FIG. 7(a). At this head height threshold, the depth image does not contain any pixel values indicative of surfaces of scene objects. In that case, the mask represented by the image frame 62 contains all pixels of the second values. With no target region, the method 150 will proceed to 170 to decrement the selected height value.

At this point, the selected height value corresponds to the second topmost dot-dash line in the height range in FIG. 7(a). The image frame 63 represents the mask by applying the selected head height threshold to the depth image of the scene. At this head height threshold, a portion of the head of person D is captured. The mask represented by the image frame 63 includes a region of pixels of the first value, with the remaining pixels having the second value. The target region is indicative of surfaces of the portion of the head of person D that is above the head height threshold. The method 150 evaluates the target region to determine if the area of the target region is within the head size range. In this example, the area of the target region in the image frame 63 is smaller than the head size range. The method 150 will proceed to 170 to decrement the selected height value.

At this point, the selected height value corresponds to the third topmost dot-dash line in the height range in FIG. 7(a). The image frame 64 represents the mask by applying the selected head height threshold to the depth image of the scene. At this head height threshold, a portion of the head of person D is captured. The mask represented by the image frame 64 includes a region of pixels of the first value, with the remaining pixels having the second value. The target region 68 is indicative of surfaces of the portion of the head of person D that is above the head height threshold. The method 150 evaluates the target region to determine if the area of the target region is within the head size range. In this example, the area of the target region 68 in the image frame 64 is large enough to be within the head size range. The method 150 then proceed to determine if the target region 68 in the image frame 64 has a roundness value within the roundness range. In this case, the target region 68 meets the roundness range requirement. The method 150 therefore classifies the target region 68 as a head count. In this manner, the head of person D is detected and person D is counted.

The method 150 then masks the target region 68 classified in image frame 64. In particular, as shown in image frame 65, the pixels in the classified target region 68 in image frame 64 have been set to the second value and will not be considered in further analysis for detecting target regions. The method 150 will proceed to 170 to decrement the selected height value.

At this point, the selected height value corresponds to the fourth topmost dot-dash line in the height range in FIG. 7(a). The image frame 66 represents the mask by applying the selected head height threshold to the depth image of the scene. At this head height threshold, a portion of the shoulder of person D is captured. The mask represented by the image frame 66 includes a region of pixels of the first value, with the remaining pixels having the second value. Furthermore, the pixels in the previously classified target region have been set to the second value and thus the pixels will not be considered in this evaluation. The target region 69 is indicative of surfaces of the portion of the shoulder of person D that is above the head height threshold. The method 150 evaluates the target region to determine if the area of the target region is within the head size range. In this example, the area of the target region in the image frame 66 is large enough to be within the head size range. The method 150 then proceed to determine if the target region 69 in the image frame 66 has a roundness value within the roundness range. In this case, the target region 69 has an irregular shape and does not meet the roundness range requirement. The method 150 therefore does not classify the target region 69 as a head count. The method 150 will proceed to 170 to decrement the selected height value.

At this point, the selected height value corresponds to the last dot-dash line in the height range in FIG. 7(*a*). The image frame 67 represents the mask by applying the selected head height threshold to the depth image of the scene. At this head height threshold, a portion of the shoulder of person D as well as a portion of the head of person E are captured. The mask represented by the image frame 67 includes two regions of pixels of the first value, with the remaining pixels having the second value. Furthermore, the pixels in the previously classified target region have been set to the second value and thus the pixels will not be considered in this evaluation. The first target region is indicative of surfaces of the portion of the shoulder of person D that is above the head height threshold. The first target region will not be counted as the head of a person as the first target region will fail the roundness criteria. The second target region is indicative of the surfaces of the portion of the head of person E. The second target region meets the head size range and the roundness criteria. The method 150 therefore classifies the second target region as a head count. In this manner, the head of person E is detected and person E is counted.

In this manner, the overhead person detection method operate to detect and count the persons in a scene using overhead depth images.

In alternate embodiments of the present disclosure, the overhead person detection method 150 further applies optical flow analysis to determine whether the pixel values in the detected target region have substantially identical relative motion. That is, if a target region is to be considered to be the head of a person, then all the pixels within the target region should be moving in the same direction. Accordingly, the method 150 may further apply the optical flow analysis, in addition to the head size and the head roundness parameters to classify a target region as a head of a person. In other words, pixels of the head of a person should all move together. Therefore, the relative motion of the pixels in the depth image can be used to determine if certain pixels should be grouped together to be considered a target region.

In embodiments of the present disclosure, the overhead person detection method and system applies a set of criteria to classify a target region in a depth image at a given height location as the head of a person or not. In some embodiments, the head size range is used so that only target regions having a size on the order of heads of typical person will be considered. In other embodiments, the roundness range is used so that only target regions having a roundness or compactness sufficiently close to a circle will be considered. In other embodiments, optical flow analysis is performed so that only pixels that move in the same direction will be grouped together for detection and classification as the head of a person.

In some embodiments, the roundness range is selected so that the shoulder region of a person will not meet the roundness requirement. Meanwhile, a rectangular or square box being carried by a person will not meet the roundness requirement. However, a person carrying a spherical or circle object may be counted as two persons. Furthermore, persons wearing hats may have roundness values within the roundness range.

In embodiments of the present disclosure, the overhead person detection and identification system and method is further applied to identify and/or re-identify a person using overhead depth images. In some embodiments, the overhead person detection and identification system and method generates a person identifier for an image region that has been classified as a person. In some embodiments, the person identifier is a set of information about the person being counted obtained from the image region. In embodiments of the present disclosure, the overhead person detection and identification system and method generates a person identifier using depth values and other attributes of an image region that has been classified as a person. In one embodiment, the person identifier is generated using depth values of an image region meeting a given compactness criteria. The person identifier is associated with metadata associating the person identifier with a location or a time duration. The person identifier can then be used to re-identify or track a person by comparing to person identifiers previously obtained from other overhead depth images.

In some embodiments, the overhead person detection and identification system and method may apply the person detection method described above to classify an image region as a person. The overhead person detection and identification system and method is then applied to generate a person identifier using a descriptor value associated with a classified target region obtained using the person detection method described above.

For example, an enterprise may install sensor devices distributed in a given area, such as a store or an office building. Each sensor device collects depth images at its respective location. The depth images are processed and evaluated to classify head count. Using the information from the classification, person identification information may be obtained for each head being counted and the person identification information may then be used to re-identify or track the same person throughout the given area.

Figure 8:
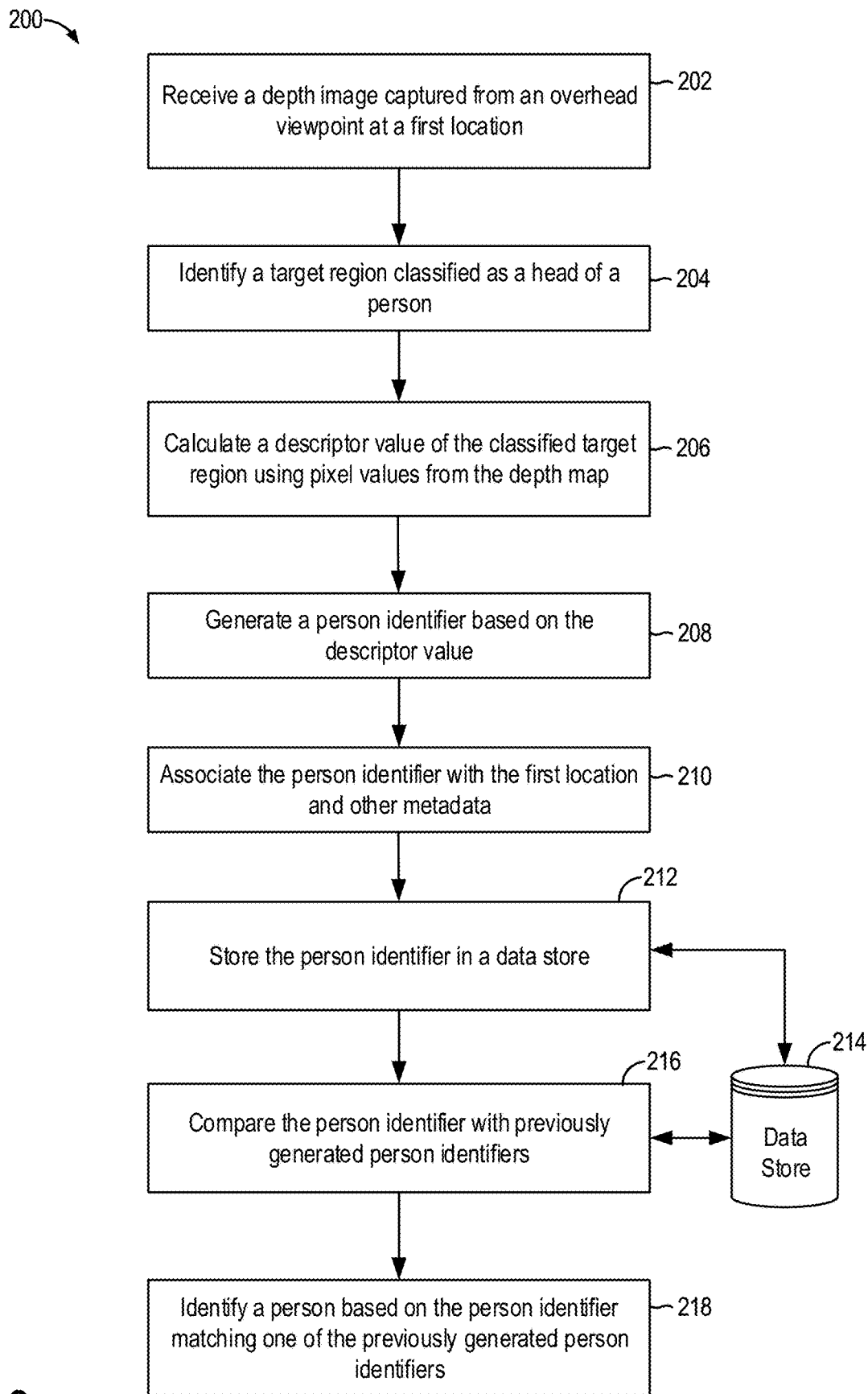
FIG. 8 is a flowchart illustrating an overhead person detection and identification method in alternate embodiments of the present disclosure.

FIG. 8 is a flowchart illustrating an overhead person detection and identification method for person identification or re-identification in alternate embodiments of the present disclosure. Referring to FIG. 8, an overhead person identification method 200 receives a depth image captured from an overhead viewpoint at a first location (202). The method 200 then identifies a target region which can be classified as a head of a person (204). For example, the methods described above with reference to FIG. 4 or 7 can be used.

In response to a target region being classified as the head of a person, the method 200 calculates a descriptor value of the classified target region using pixel values from the depth map (206). In some embodiments, the descriptor value is calculated as a statistics value of the pixel values of the target region. For example, the descriptor value can be the mean or the average of the pixel values (depth values) in the target region can be used. The mean or average of the pixel values of the target region is also representative of the mean or average height of the person identified by the target region. In another embodiment, the descriptor value is calculated based on the shape of the structure in the target region. Alternately, the descriptor value is calculated based on the three dimensional structure depicted in the target region. Other methods to generate a descriptor value of the target region may be used in other embodiments.

The method 200 then generates a person identifier based on the descriptor value (208). The method 200 then associates the person identifier with the first location and with other metadata (210). In some embodiments, the person identifier may be associated with metadata describing the time the depth image was taken, the specific sensor device used to capture the depth image or other information useful to the user. The person identifier and associated metadata may be stored in a data store (212), such as data store 214. In this manner, the method 200 generates identification for each target region being classified as the head of a person.

In embodiments of the present disclosure, the method 200 further implements the function of re-identifying a person within a surveillance area or surveillance duration. Referring still to FIG. 8, after a person identifier has been generated for a target region, the method 200 compare the person identifier with previously generated person identifiers (216). The previously generated person identifiers may be generated from depth images captured over a surveillance area and over a surveillance time duration. In some embodiments, all the person identifiers generated from classified target regions may be stored in a data store 214. The method 200 may compare the person identifier recently generated to the person identifiers stored in data store 214. The method 200 identifies a person based on the person identifier matching one of the previously identified person identifiers (218).

More specifically, in some embodiments, each time a new person identifier is generated, the method 200 compares the person identifier against previously generated identifiers, such as those stored in data store 214. If a match is found, the matching person identifiers may be linked and the location and metadata information associated with the person identifiers may then be used to provide location and tracking information for the person associated with the person identifiers. Accordingly, a person traveling from place to place within the surveillance area may be identified using overhead depth images captured at different locations and person identifiers that are generated using descriptor values of the classified target regions from the depth images.

In one example, in a retail environment, a first person entering a first entrance may be identified by a first depth image captured at that location. A first person identifier for the first person may then be generated and stored. Then, at a later time, a second depth image captured at another location, such as the perfumes department, is processed to identify a second person and a second person identifier is generated. The second person identifier is compared against all the previously generated person identifiers. In response to the second person identifier matching the first person identifier, the system can conclude that the second person is the same as the first person and the first person has traveled from the first entrance to the perfumes department.

In other examples, the person identifiers can also be used to identify occupants in a space. For example, person identifiers can be obtained for persons entering a building at all the building's entrances. Then, person identifiers of persons inside the building can be obtained and compared against the person identifiers obtained for persons entering the building. The person identifiers from inside the building should match the person identifiers of those entering the building. Discrepancies, such as a person identifier inside the building not matching any person identifiers entering the building, can be flagged for security action. As this applied, the overhead person identification system and method of the present disclosure can be used to re-identify a person over a given space and over a given time duration. The overhead person identification system and method of the present disclosure enables person surveillance while providing privacy of the individuals because only depth images are used, not facial images.

In embodiments of the present disclosure, matching of the person identifiers can include finding an exact match or finding a sufficiently close approximate match. In some cases, the overhead person detection and identification system and method may be applied in applications where accurate tracking or re-identification of specific individual is necessary. In that case, the person identifier generated for a counted person ("the subject person identifier") will be compared against the previously generated person identifiers to find an exact match. In this case, a match is found only when the subject person identifier is an exact match to the previously generated person identifiers.

In other cases, the overhead person detection and identification system and method may be applied in applications where accurate tracking of specific individual is not critical. In that case, the person identifier generated for a counted person ("the subject person identifier") will be compared against the previously generated person identifiers to find close enough approximate matches in the previously generated person identifiers. For example, a previously generated person identifier that is the nearest neighbor to the subject person identifier can be identified as a match. In this case, a match is found when the person identifier is a close approximate match, or a proximate match, to the previously generated person identifiers. In this manner, the person identifier can be applied to find exact match or proximate match in the previously generated person identifiers.

Figure 9:
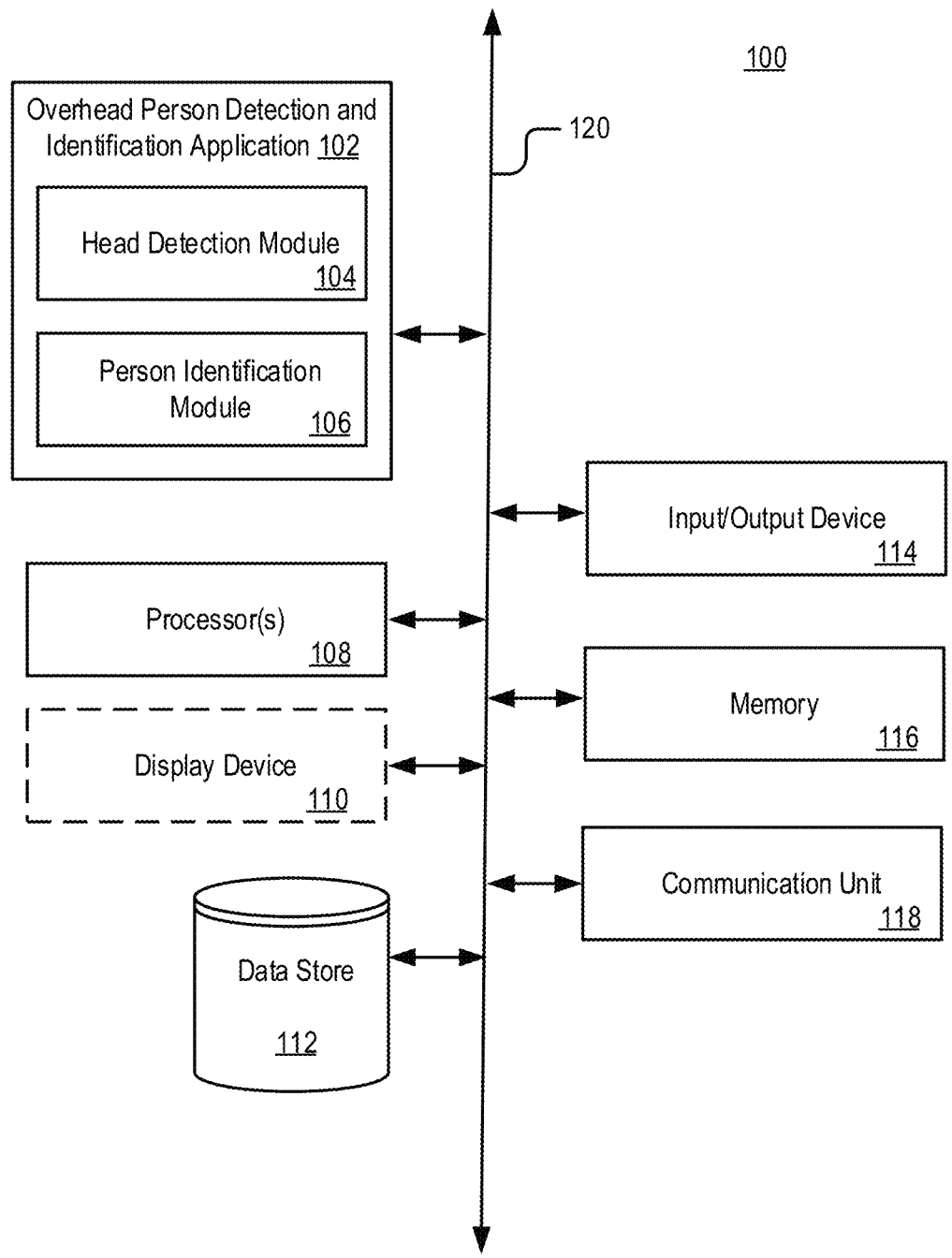
FIG. 9 is a block diagram of an example computing system which may represent the computer architecture of a computing device, computing entity, or server for implementing the overhead person detection and identification system in embodiments of the present disclosure.

FIG. 9 is a block diagram of an example computing system which may represent the computer architecture of a computing device, computing entity, or server for implementing the overhead person detection and identification system in embodiments of the present disclosure. Referring to FIG. 9, in some embodiments, the computing device 100 is implemented as a system which may also include one or more processors 108, a memory 116, an optional display device 110, a communication unit 118, a data storage 112, and an input/output device 114 according to some examples. The components of the system 100 are communicatively coupled to a bus 120 for communication with each other. The computing device further includes an overhead person detection and identification application 102 for person identification and counting functions.

The processor 108 may execute software instructions by performing various input/output, logical, and/or mathematical operations. The processor 108 may have various computing architectures to process data signals. The processor 108 may be physical and/or virtual and may include a single processing unit or a plurality of processing units and/or cores. In some implementations, the processor 108 may be capable of generating and providing electronic display signals to a display device and other functions. In some implementations, the processor 108 may be coupled to the memory 116 via the bus 120 to access data and instructions therefrom and store data therein. The bus 120 may couple the processor 108 to the other components of the system including, for example, the memory 116, the communication unit 118, the overhead person detection and identification application 102, and the data storage 243. It will be apparent to one skilled in the art that other processors, operating systems, and physical configurations are possible.

The memory 116 may store and provide access to data for the other components of the system. In some implementations, the memory 116 may store instructions and/or data that may be executed by the processor 108. The instructions and/or data may include code for performing the techniques described herein. For example, in one embodiment, the memory 116 may store the overhead person detection and identification application 102. The memory 116 is also capable of storing other instructions and data, including, for example, an operating system, hardware drivers, other software applications, databases, etc. The memory 116 may be coupled to the bus 120 for communication with the processor 108 and the other components of the system.

The memory 116 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.) mediums, which can be any tangible apparatus or device that can contain, store, communicate, or transport instructions, data, computer programs, software, code, routines, etc., for processing by or in connection with the processor 108. In some implementations, the memory 116 may include one or more of volatile memory and non-volatile memory. It should be understood that the memory 116 may be a single device or may include multiple types of devices and configurations.

The display device 110 may be a liquid crystal display (LCD), light emitting diode (LED) or any other similarly equipped display device, screen or monitor. The display device 110 represents any device equipped to display user interfaces, electronic images and data as described herein. In different embodiments, the display is binary (only two different values for pixels), monochrome (multiple shades of one color), or allows multiple colors and shades. The display device 110 is coupled to the bus 120 for communication with the processor 108 and the other components of the system. It should be noted that the display device 110 is shown in FIG. 9 with dashed lines to indicate it is optional. For example, the system may be a server for performing overhead person identification without a display device 110.

The communication unit 118 is hardware for receiving and transmitting data by linking the processor 108 to a data network and other processing systems. In one embodiment, the communication unit 118 may include a port for direct physical connection to a data network. In another embodiment, the communication unit 118 may include a wireless transceiver (not shown) for exchanging data via a wireless network using one or more wireless communication methods, such as IEEE 802.11, IEEE 802.16, Bluetooth®, cellular communications, or another suitable wireless communication method.

The data storage 112 (or data store 112) is a non-transitory memory that stores data for providing the functionality described herein. In the illustrated embodiment, the data storage 112 is communicatively coupled to the bus 120 to receive data for storage and provide data for retrieval upon a request for the data. The data storage 112 may store depth images, person count values, person identifiers and associated metadata.

In some embodiments, the overhead person detection and identification application 102 includes a head detection module 104 and a person identification module 106. The components of the overhead person detection and identification application 102 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 108. In some embodiments, the components are instructions executable by the processor 108. In some implementations, the components are stored in the memory 116 and are accessible and executable by the processor 108.

In embodiments of the present disclosure, the overhead person detection and identification application 102 implements the method described above with reference to FIG. 4, FIG. 6 and FIG. 8 to perform head detection functions, person counting functions and person identification functions, as described above.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method for person detection using overhead images, the method comprising:
   receiving a depth image captured from an overhead viewpoint at a first location;
   detecting in the depth image for a target region indicative of a scene object within a height range;
   determining whether a detected target region has an area within a head size range;

in response to the detected target region being within the head size range, determining whether the detected target region has a roundness value less than a maximum roundness value;

in response to the detected target region having the roundness value less than the maximum roundness value, classifying the detected target region as a head of a person;

in response to the classifying, masking the classified target region in the depth image, the masked region being excluded from detecting; and repeating the detecting to the masking to detect for and classify another target region in the depth image within the height range and outside of the masked region.

2. The method of claim 1, wherein the depth image comprises a two dimensional array of pixel values, each pixel value being a depth value indicative of a distance of a surface of a scene object from the overhead viewpoint at the first location, wherein each depth value is related to a height value indicative of a distance from the depth value to a reference depth location distant from the overhead viewpoint.

3. The method of claim 2, wherein detecting in the depth image for a target region within a height range comprises:
   selecting a height value from the height range;
   setting the selected height value as a head height threshold; and
   detecting in the depth image for a target region indicative of a scene object at the head height threshold, the target region being a region having pixel values with corresponding height values that are equal to or greater than the head height threshold.

4. The method of claim 3, wherein selecting a height value from the height range comprises selecting a height value being a maximum height value in the height range; and wherein repeating the detecting to the masking to detect for and classify another target region in the depth image within the height range and outside of the masked region comprises:
   decrementing the height value;
   setting the decremented height value as the head height threshold;
   detecting in the depth image for a target region indicative of a scene object at the head height threshold and outside of the masked region; and
   repeating the decrementing to the detecting until the height value is decremented to a minimum height value in the height range.

5. The method of claim 2, wherein detecting in the depth image for a target region within a height range comprises:
   selecting a depth value from a depth range corresponding to the height range;
   setting the selected depth value as a head depth threshold; and
   detecting in the depth image for a target region indicative of a scene object at the head depth threshold, the target region being a region having pixel values with corresponding depth values that are equal to or less than the head depth threshold.

6. The method of claim 5, wherein selecting a depth value from the depth range comprises selecting a depth value being a minimum depth value in the depth range; and wherein repeating the detecting to the masking to detect for and classify another target region in the depth image within the height range and outside of the masked region comprises:
   incrementing the depth value;
   setting the incremented depth value as the head depth threshold;
   detecting in the depth image for a target region indicative of a scene object at the head depth threshold and outside of the masked region; and
   repeating decrementing to the detecting until the depth value is incremented to a maximum depth value in the depth range.

7. The method of claim 2, wherein the depth image comprises a two dimensional array of pixel values and the method further comprises:
   determining, using optical flow analysis, whether the pixel values in the detected target region have substantially identical relative motion; and
   in response to the pixel values in the detected target region having substantially identical relative motion and being within the head size range and having the roundness value less than the maximum roundness value, classifying the detected target region as a head of a person.

8. The method of claim 1, wherein the height range is selected to approximate a range of head height locations of typical adult persons and the head size range is selected to approximate a range of head circumference values of the typical adult persons.

9. The method of claim 1, wherein the maximum roundness value denotes a maximum shape deviation from a circle where the shape is considered the head of a typical adult person.

10. The method of claim 1, wherein the depth image comprises a two dimensional array of pixel values and the method further comprises:
    in response to classifying the detected target region as a head of a person, calculating a descriptor value using pixel values associated with the classified target region;
    generating a first person identifier based on the descriptor value;
    associating the first person identifier with the first location and metadata associated with the depth image; and
    storing the first person identifier in a data store.

11. The method of claim 10, further comprising:
    comparing the first person identifier with previously generated person identifiers; and
    identifying a person in response to the first person identifier matching one of the previously generated person identifiers.

12. The method of claim 11, further comprising:
    tracking the person using the locations and the metadata associated with the first person identifier and the matched previously generated person identifiers.

13. A system for person detection using overhead images, the system comprising:
    a hardware processor; and
    a memory coupled with the hardware processor, wherein the memory is configured to provide the processor with instructions which when executed cause the processor to:
    receive a depth image captured from an overhead viewpoint at a first location;
    detect in the depth image for a target region indicative of a scene object within a height range;
    determine whether a detected target region has an area within a head size range;
    in response to the detected target region being within the head size range, determine whether the detected target region has a roundness value less than a maximum roundness value;

in response to the detected target region having the roundness value less than the maximum roundness value, classify the detected target region as a head of a person;

in response to the classifying, mask the classified target region in the depth image, the masked region being excluded from detecting; and repeat the detecting to the masking to detect for and classify another target region in the depth image within the height range and outside of the masked region.

14. The system of claim 13, wherein the depth image comprises a two dimensional array of pixel values, each pixel value being a depth value indicative of a distance of a surface of a scene object from the overhead viewpoint at the first location, wherein each depth value is related to a height value indicative of a distance from the depth value to a reference depth location distant from the overhead viewpoint.

15. The system of claim 14, wherein the memory is further configured to provide the processor with instructions which when executed cause the processor to:

select a height value from the height range;

set the selected height value as a head height threshold; and detect in the depth image for a target region indicative of a scene object at the head height threshold, the target region being a region having pixel values with corresponding height values that are equal to or greater than the head height threshold.

16. The system of claim 15, wherein to select a height value from the height range comprises to select a height value being a maximum height value in the height range, and wherein the memory is further configured to provide the processor with instructions which when executed cause the processor to:

decrement the height value;

set the decremented height value as the head height threshold;

detect in the depth image for a target region indicative of a scene object at the head height threshold and outside of the masked region; and repeat the decrementing to the detecting until the height value is decremented to a minimum height value in the height range.

17. The system of claim 14, wherein the memory is further configured to provide the processor with instructions which when executed cause the processor to:

select a depth value from a depth range corresponding to the height range;

set the selected depth value as a head depth threshold; and detect in the depth image for a target region indicative of a scene object at the head depth threshold, the target region being a region having pixel values with corresponding depth values that are equal to or less than the head depth threshold.

18. The system of claim 17, wherein to select a depth value from the depth range comprises to select a depth value being a minimum depth value in the depth range, and wherein the memory is further configured to provide the processor with instructions which when executed cause the processor to:

increment the depth value;

set the incremented depth value as the head depth threshold;

detect in the depth image for a target region indicative of a scene object at the head depth threshold and outside of the masked region; and repeat decrementing to the detecting until the depth value is incremented to a maximum depth value in the depth range.

19. The system of claim 13, wherein the height range is selected to approximate a range of head height locations of typical adult persons and the head size range is selected to approximate a range of head circumference values of the typical adult persons; and wherein the maximum roundness value denotes a maximum shape deviation from a circle where the shape is considered the head of a typical adult person.

20. The system of claim 13, wherein the depth image comprises a two dimensional array of pixel values and wherein the memory is further configured to provide the processor with instructions which when executed cause the processor to:

determine, using optical flow analysis, whether pixel values in the detected target region have substantially identical relative motion; and in response to the pixel values in the detected target region having substantially identical relative motion and being within the head size range and having the roundness value less than the maximum roundness value, classify the detected target region as a head of a person.

21. The system of claim 13, wherein the memory is further configured to provide the processor with instructions which when executed cause the processor to:

in response to classifying the detected target region as a head of a person, calculate a descriptor value using pixel values associated with the classified target region;

generate a first person identifier based on the descriptor value;

associate the first person identifier with the first location and metadata associated with the depth image; and store the first person identifier in a data store.

22. The system of claim 21, wherein the memory is further configured to provide the processor with instructions which when executed cause the processor to:

compare the first person identifier with previously generated person identifiers; and identify a person in response to the first person identifier matching one of the previously generated person identifiers.

23. The system of claim 22, wherein the memory is further configured to provide the processor with instructions which when executed cause the processor to:

track the person using the locations and the metadata associated with the first person identifier and the matched previously generated person identifiers.

* * * * *